(12) United States Patent
Chatterjea et al.

(10) Patent No.: US 10,034,211 B2
(45) Date of Patent: Jul. 24, 2018

(54) DELEGATED CHANNEL SWITCHING FOR MESH-TYPE NETWORKS

(71) Applicant: PHILIPS LIGHTING HOLDING B.V., Eindhoven (NL)

(72) Inventors: Supriyo Chatterjea, Eindhoven (NL); Lei Feng, Shanghai (CN); Tim Corneel Wilhelmus Schenk, Eindhoven (NL); Daniel Martin Goergen, Eindhoven (NL); Michael Petrus Franciscus Verschoor, Eindhoven (NL); Winfried Antonius Henricus Berkvens, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 285 days.

(21) Appl. No.: 14/758,587

(22) PCT Filed: Dec. 18, 2013

(86) PCT No.: PCT/IB2013/061068
§ 371 (c)(1),
(2) Date: Jun. 30, 2015

(87) PCT Pub. No.: WO2014/106788
PCT Pub. Date: Jul. 10, 2014

(65) Prior Publication Data
US 2015/0350987 A1    Dec. 3, 2015

Related U.S. Application Data

(60) Provisional application No. 61/748,336, filed on Jan. 2, 2013.

(51) Int. Cl.
*H04W 4/00* (2018.01)
*H04W 36/20* (2009.01)
(Continued)

(52) U.S. Cl.
CPC ........... *H04W 36/20* (2013.01); *H04W 24/02* (2013.01); *H04W 36/0055* (2013.01);
(Continued)

(58) Field of Classification Search
CPC .................................................. H04W 72/082
(Continued)

(56) References Cited

U.S. PATENT DOCUMENTS

| 5,805,578 A | 9/1998 | Stirpe |
| 2003/0053697 A1* | 3/2003 | Aylward ............... G06T 7/0012 382/203 |

(Continued)

FOREIGN PATENT DOCUMENTS

WO      2013030715 A1    3/2013

OTHER PUBLICATIONS

Roy, Claude et al "Fast Multichannel Switching for IEEE 802.11s Multi radio Wireless Mesh Networks", Globecom Workshops, IEEE 2011, pp. 303-308.
(Continued)

*Primary Examiner* — Brandon Renner
*Assistant Examiner* — Abdeltif Ajid

(57) ABSTRACT

The disclosure describes is a channel switching strategy and corresponding protocol for a mesh network which comprises a segment controller (SC) and a large number of outdoor luminaire controllers (OLCs) or other network nodes. A channel switching process is initiated and managed by the SC which transmits a channel switching command to all nodes in the system. Following the actual channel switch, the SC delegate's responsibility to request an orphan node to switch to the new channel to a selected delegate node which is a neighbor node of the orphan node. The selection of the delegate node may be based on a prioritization. When an OLC does not receive any messages for a specified, prolonged period of time, it may scan available frequency bands to find the (new) channel in which the networked system operates at that time.

11 Claims, 4 Drawing Sheets

(51) Int. Cl.
  *H04W 24/02* (2009.01)
  *H04W 72/08* (2009.01)
  *H04W 36/00* (2009.01)
  *H04W 88/08* (2009.01)
  *H04W 84/18* (2009.01)

(52) U.S. Cl.
  CPC .......... *H04W 72/082* (2013.01); *H04W 84/18* (2013.01); *H04W 88/08* (2013.01)

(58) Field of Classification Search
  USPC ........................................................ 370/331
  See application file for complete search history.

(56) References Cited

U.S. PATENT DOCUMENTS

| | | | | |
|---|---|---|---|---|
| 2004/0162834 | A1* | 8/2004 | Aono | G06F 17/30675 |
| 2009/0043879 | A1* | 2/2009 | Jamieson | H04L 45/00 709/223 |
| 2009/0168706 | A1 | 7/2009 | Avonts | |
| 2009/0201851 | A1* | 8/2009 | Kruys | H04W 16/14 370/328 |
| 2011/0047538 | A1* | 2/2011 | Chung | H04L 41/082 717/173 |
| 2011/0176459 | A1* | 7/2011 | Patel | H04W 72/1257 370/256 |
| 2011/0199980 | A1* | 8/2011 | Denteneer | H04L 45/00 370/328 |
| 2012/0026899 | A1 | 2/2012 | Lee | |
| 2012/0317275 | A1* | 12/2012 | Lee | H04L 67/104 709/224 |

OTHER PUBLICATIONS

Hwang, Kwang-Il et al "Adaptive Multi-Channel Utilization Scheme for Coexistence of IEEE802.15.4 LR-WPAN with Other Interfering Systems", High Performance Computing and Communications, 2009, pp. 297-304.

* cited by examiner

|          | OLCs |  |  |  |
|----------|------|------|------|------|
|          | $ID_b$ | $ID_{b+1}$ | ... | $ID_{b+m}$ |
| OLC-Os $ID_a$ | $d(ID_a, ID_b)$ | $d(ID_a, ID_{b+1})$ | $d(ID_a, ...)$ | $d(ID_a, ID_{b+m})$ |
| $ID_{i+1}$ | $d(ID_{i+1}, ID_b)$ | $d(ID_{i+1}, ID_{b+1})$ | $d(ID_{i+1}, ...)$ | $d(ID_{i+1}, ID_{b+m})$ |
| ... | $d(..., ID_b)$ | $d(..., ID_{b+1})$ | $d(..., ...)$ | $d(..., ID_{b+m})$ |
| $ID_{i+n}$ | $d(ID_{i+n}, ID_b)$ | $d(ID_{i+n}, ID_{b+1})$ | $d(ID_{i+n}, ...)$ | $d(ID_{i+n}, ID_{b+m})$ |

FIG. 5

| R | OLC-O (ID) | OLC (ID) | d(OLC-O, OLC) |
|---|-----------|----------|---------------|
| 1 | 4  | 3  | d(4,3)  |
| 2 | 20 | 9  | d(20,9) |
| 3 | 15 | 13 | d(15,13)|
| 4 | 7  | 2  | d(7,2)  |

FIG. 6

DELEGATED CHANNEL SWITCHING FOR MESH-TYPE NETWORKS

CROSS-REFERENCE TO PRIOR APPLICATIONS

This application is the U.S. National Phase application under 35 U.S.C. § 371 of International Application No. PCT/IB2013/061068, filed on Dec. 18, 2013, which claims the benefit of U.S. Provisional Patent Application No. 61/748,336, filed on Jan. 2, 2013. These applications are hereby incorporated by reference herein.

FIELD OF THE INVENTION

The invention relates to the field of multi-channel mesh-type networks which may be used for e.g. lighting control, home automation, patient monitoring, intelligent building control or sensor networking applications and which comprise a plurality of network nodes serving as relay nodes for communication.

BACKGROUND OF THE INVENTION

The number of devices using some form of wireless communication to communicate is rapidly increasing in multiple application areas, such as in lighting control, building or city management, high-speed Internet access, security and surveillance, home automation and industrial monitoring and control systems. As a result of the wide-spread adoption of wireless networking technology, the interference between different systems is increasingly becoming a factor that affects the operational performance of such networked systems. This is especially true since many systems will use unlicensed industrial, scientific and medical (ISM) bands, like in the sub-1-GHz band and in the 2.4 GHz ISM band. For instance, in the latter band there are multiple systems for different application scenarios, e.g. WiFi, Bluetooth, and Zigbee.

A system used for medical or lighting monitoring and control applications, should be robust and, consequently, include an interference agility mechanism, which can deal with certain levels of interference. However, the performance of systems using wireless radio communication can be degraded or obstructed in the presence of radio interference. Interference can be caused by any electrical device that emits radio waves with sufficient power and uses a frequency that is approximately equal to the operating frequency used by the affected system.

As an increasing number of devices are sharing the same bands, the issue of coping with radio interference is becoming more important than ever before. Radio interference has the potential to severely degrade the network performance of any system that is communicating wirelessly. This makes it essential to develop techniques that can help mitigate the problem of interference.

In a multi-channel system (e.g. Zigbee and other 802.15.4-based systems having 16 channels in the 2.4 GHz ISM band, and 4 to 10 bands in the sub-GHz band), a possible solution to solve the interference issue is to move the system's working frequency to a clean channel. This is relatively simple in single hop network applications, for example, a wireless mouse. A simple synchronization between peer devices is sufficient to ensure successful channel switching.

In a multi-hop mesh topology, all nodes serve as potential relay (intermediary) nodes of an end-to-end routing function. As a result of the redundancy in routes between any two nodes and the self-organizing nature, mesh topologies are robust to changes in the ambient environment. However, they also increases the complexity of switching the networked system to a different carrier frequency.

The easiest approach would be to introduce a new system/network management message specifying the new channel. However, some nodes may not receive this message (or not in time) due to message loss (e.g. due to interference), temporary unavailability of nodes (e.g. since they are not switched to the power), message delays, etc. This is an important issue in a mesh network because nodes that did not receive the "channel switch" message, will not change to the indicated channel at the specified time, possibly resulting in a disconnected network when the affected node(s) is/are on a critical routing path.

How does the system efficiently and effectively deals with nodes that did not switch to the new channel (subsequently referred to as "orphan nodes")? How does the system synchronize all nodes (especially the nodes who act as routers for messages) to move to the new channel together? How can the system guarantee that the whole system moved to the new channel? It is clear that many issues are to be solved in the mesh network context, concerning channel switching. Otherwise, the system cannot work properly and will not provide a sufficient quality of service.

SUMMARY OF THE INVENTION

It is an object of the present invention to provide a multi-channel mesh-type network capable of smoothly and reliably switching the whole mesh-type network to a new channel and reducing the impact of interference.

This object is achieved by a controller device as claimed in claim 1, by a method as claimed in claim 10, and by a computer program product as claimed in claim 11.

All solutions as defined in the above independent device and method claims relate to interrelated products which interact in the mesh-type network to achieve the above object.

Accordingly, a main channel switching command is transmitted to the network nodes and one or more delegate nodes, e.g., (a) neighboring node(s) of the orphan node(s), is/are selected based on received responses to the main channel switching command. Then, one or more local channel switching commands are (locally) transmitted from the one or more delegate nodes to one or more orphan nodes from which no response to the first channel switching response has been received. Thus, in case of an unsuccessful channel switch at a first attempt where certain nodes are unable to switch channels, certain nodes are selected and assigned as delegate nodes. These delegate nodes are then given the responsibility to ensure that orphan nodes that have not switched channels are recovered. Additionally, network nodes may check whether they have received any command (e.g. a channel switching command or any other command) within a predetermined time period, and may scan available frequency bands to find an operating channel of said mesh-type network if they have not received any command within the predetermined time period. All these measures ensure that large scale mesh network systems are allowed to smoothly change to a new channel. Moreover, the proposed delegation node strategy reduces communication traffic and processing power for non-used nodes. Also, it minimizes risk, since a minimal number of nodes need to switch back to the previous channel for this process.

According to a first aspect, a timing parameter which specifies an amount of time for which the network nodes should still stay in their current channel may be added to the main channel switching command. Thereby, the actual channel switching can be delayed for a certain time period to prevent disconnection of distant nodes due to a premature channel switch of nodes that serve as a relay on the route from the controller device to these distant nodes. In a specific example of the first aspect, the timing parameter may be selected based on one of or both of an observed size and a link quality of the mesh-type network.

According to a second aspect which can be combined with the first aspect, a list of orphan nodes may be maintained at the controller device, and the list of orphan nodes may be updated based on responses to the local channel switching command. Thus, the controller device is continuously informed about the number and location of orphan nodes and routing decisions or other decisions influenced by the number and location of orphan nodes can be adapted accordingly.

According to a third aspect which can be combined with one or both of the first and second aspects, the selected delegate nodes may be prioritized based on a previous link quality or a geographical closeness to the orphan nodes. Thereby, likelihood of success of the delegate switching process can be increased. According to specific examples of the third aspects, the prioritization of the selected delegate nodes may be based on location information obtained during a commissioning phase of the delegate nodes and/or orphan nodes or based on data received from the delegate nodes and/or orphan nodes while the network is in operation. Thus, prioritization may be based on a centralized or decentralized approach.

According to a fourth aspect which can be combined with at least one of the first to third aspects, the orphan nodes may be prioritized based on a routing path between the controller device and the orphan nodes. Thereby, orphan nodes located on critical routing paths can be addressed at higher priority to ensure proper network operation.

According to a fifth aspect which can be combined with at least one of the first to fourth aspects, a distance ranking table of distances between network nodes from which a response to the first or local channel switching commands has been received and orphan nodes from which no response to the first and local channel switching command has been received may be created, and an orphan node and a delegate node may be successively selected based on a ranking in the distance ranking table until the controller device has attempted to recover all orphan nodes of the mesh-type network. This measure ensures that all orphan nodes are addressed while close node pairs are prioritized to increase likelihood of success of node recovery.

According to a sixth aspect which can be combined with at least one of the first to fifth aspects, the delegate node may switch to a previous channel or a default channel after it has transmitted the first local channel switching command, and may then transmit a second local channel switching command on the previous channel or the default channel, respectively. Thereby, it can be ensured that such orphan nodes which have not yet switched to the current channel or have newly added to the network can be reached by the channel switching command.

It is noted that the control device and network device may each be implemented based on discrete hardware circuitry with discrete hardware components, an integrated chip, or an arrangement of chip modules, or based on a signal processing device or chip controlled by a software routine or program stored in a memory, written on a computer readable medium, or downloaded from a network, such as the Internet.

It shall be understood that the controller device of claim 1, the method of claim 10, and the computer program of claim 11 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 5 shows an exemplary distance matrix of orphan and working nodes;

FIG. 6 shows an exemplary distance ranking table; and

DETAILED DESCRIPTION OF EMBODIMENTS

Embodiments of the present invention are now described based on a channel switching process, system and corresponding protocol for a wireless mesh lighting control network. However, the proposed solution can be applied to other mesh networks as well.

Figure 1:
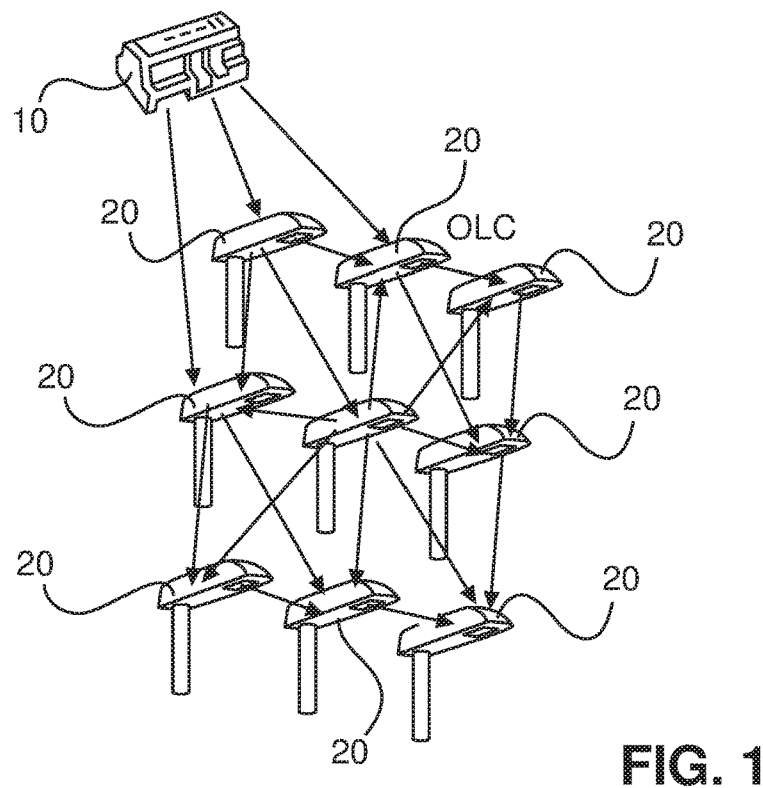
FIG. 1 shows schematic architecture of a wireless mesh lighting control network.

FIG. 1 shows a schematic architecture of the wireless mesh lighting control network which consists of a Segment Controller (SC) 10, which functions as the root of the mesh network and gateway to a back-end part of the network, and a large number of Outdoor Luminaire Controllers (OLC) 20 or nodes, typically in the order of several hundred to several thousands. Each OLC 20 controls a respective luminaire of the lighting system so that switching and dimming of the luminaires can be controlled by the SC 10.

Additionally, the channel switching process is initiated and managed by the SC 10, because the SC 10 has the information of the whole system and enough processing power and storage capacity to coordinate the channel switching process. More specifically, reliable and efficient channel switching is achieved by a synchronized broadcast channel switching where the SC 10 broadcasts a channel switching command to all nodes (i.e. OLCs 20) in the system. The target is to make sure that as much as possible nodes move to the new channel in this phase. Nodes that receive the command acknowledge its reception to the SC 10. The SC 10 thus knows which nodes did not receive the command or did not acknowledge its reception, which is registered. These nodes from which no acknowledgement (i.e. SCR) has been received at the SC 10 are referred to as "orphan nodes".

Figure 2:
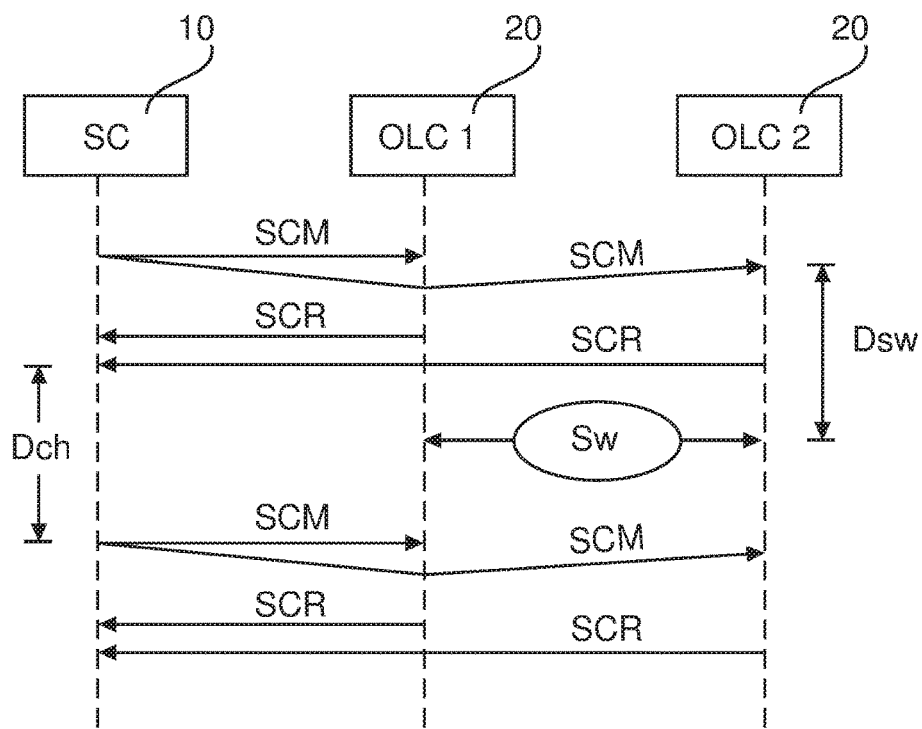
FIG. 2 shows a schematic processing and signaling diagram of a synchronized channel switching process.

FIG. 2 shows a schematic processing and signaling diagram which illustrates interactions and messages of a synchronized channel switching process. The SC 10 broadcasts a channel switching command (Switch Channel message (SCM)) with includes at least a channel and timing information to the OLCs 20 of which two exemplary OLCs (OLC1 and OLC2) are shown in FIG. 2. Having received the SCM, the OLCs 20 respond with a Switch Channel response (SCR) which includes at least a status and channel information (same channel or not the same channel). Then, the OLCs wait a predetermined timeout or delay Dsw after receipt of the SCM before they execute the channel switching action (Sw). The SC 10 waits a predetermined timeout or delay Dch after receipt of the SCR before checking the switching process by broadcasting a new SCM to be acknowledged by the OLCs 20 with an SCR including status and channel information (same channel or not same channel).

Thus, the actual channel switching action is only enacted after a certain time period (delay Dsw) has passed. This prevents disconnection of nodes due to an inconvenient premature switching time of (an) intermediate node(s) that serve(s) as a relay on the route from the SC 10 to that/those node(s). To achieve this, a timing parameter or information (e.g. timeout value) may be used in the channel switching command to let the SC tell how much time an OLC should still stay in the current channel. The SC 10 has access to the system's information and is thus capable of evaluating the delivery time of the switching message, i.e., channel switching command, in the worst case and uses it to derive the timing parameter. Consequently, this timing parameter is based on the size of the actual network, e.g., both in number of nodes and the maximum hop count observed in the system. It can also be based on the (average) message success rate of the system, since this will determine the number of unicast retransmissions which would be required.

However, during the above channel switching process, some nodes (OLCs 20) may not have moved to the new channel or the SC 10 may not have received an acknowledgment from nodes which did switch to the new channel. In this case, a mechanism is proposed to call these orphan nodes back to the system in the new channel. Following the actual channel switch, the SC 10 initiates a delegated channel switching process by delegating the responsibility to request an orphan node to switch to the new channel to a selected network neighbor of the orphan node. This approach efficiently (e.g. reducing message relay) moves orphan nodes to the new channel.

Figure 3:
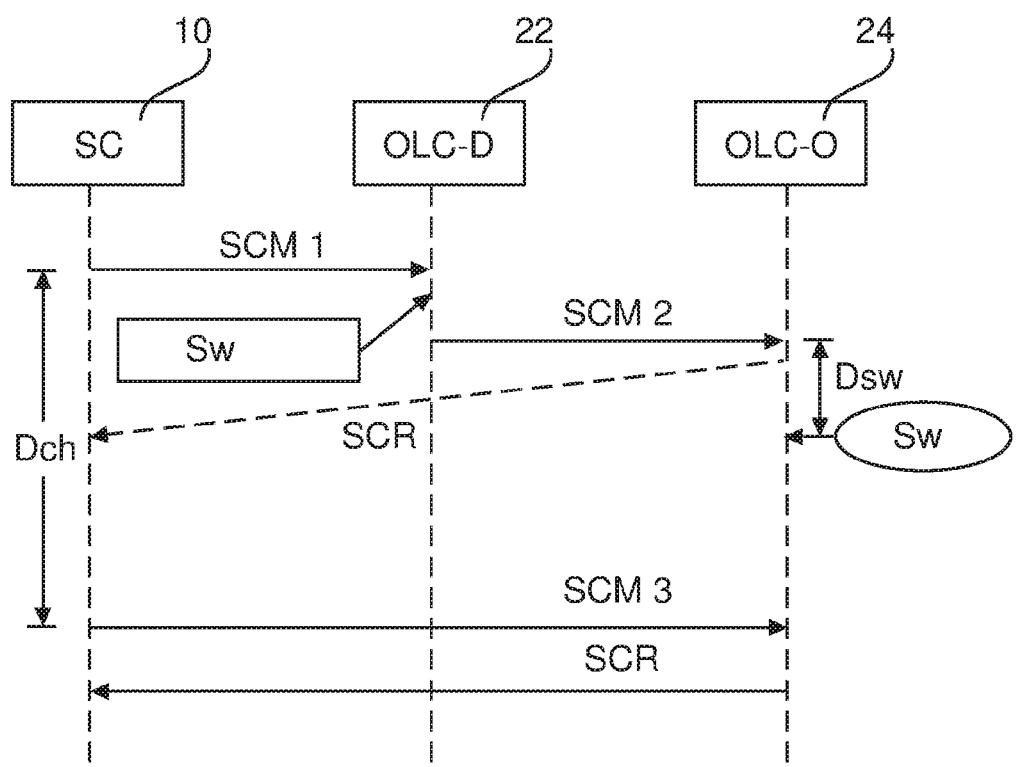
FIG. 3 shows a schematic processing and signaling diagram of a delegated channel switching process according to a first embodiment.

FIG. 3 shows a schematic processing and signaling diagram of the proposed delegated channel switching process with main and local channel switching commands according to a first embodiment.

The SC 10 has knowledge about the neighbors of orphan nodes via the previous routing paths, geographic locations of the OLCs 20, user input, or some other source of information. Instead of broadcasting the (main) channel switching command (SCM) again (which would require the whole network first to move back to the old (previous) channel), the SC 10 sends a channel switching delegation command (SCM1) which includes at least a channel, timing and orphan address information to (a) neighbor(s) (OLC-D) 22 of the orphan node (OLC-O) 24. The delegate OLC (OLC-D) 22 which received this delegation command (SCM1) will be responsible for bringing the nearby orphan node(s) (e.g. OLC-O 24) back into the system. To achieve this, the delegate OLC (OLC-D) 22 initiates a channel switching action (Sw) to change to the previous channel and sends a local channel switching command (SCM2) which includes at least a channel and delay information via the previous channel. If there is any orphan node (e.g. OLC-O 24) nearby which has not yet switched to the current channel and still operates on the previous channel, it will report back to the SC 10 with an SCR acknowledgment (including at least a status and channel information). Then, the OLC-D 22 may optionally send a further local channel switching command (not shown in FIG. 3) via the current channel. If there is any orphan node (e.g. OLC-O 24) nearby, which operates on the current channel it will report back to the SC 10 with an SCR acknowledgment (including at least a status and channel information) to update an orphan node list maintained at the SC 10. However, the SCR acknowledgement is only received by the SC 10 if the orphan node (e.g. OLC-O 24) operates on the current channel which is also used by the SC 10. Then, after the switching delay Dsw specified in the local channel switching command (SCM2), the orphan node (e.g. OLC-O 24) initiates a switching action (Sw) to the current channel. After expiry of the checking delay Dch the SC 10 broadcasts the next main switching channel command (SCM3) and receives the desired SCR acknowledgement from the recovered orphan node (e.g. OLC-O 24). Thereby, orphan nodes that are still in the previous channel can be brought back to the system in the current channel.

The proposed coordinated channel switching process can be further improved by the following measure. When a node or OLC does not receive any messages for a specified, prolonged period of time, it itself can assume that it has become an orphan node. Such an OLC may then scan the available frequency bands to find the (new) channel in which the networked system operates at that time. This approach can also be used to bring factory-fresh OLCs into an existing system. It can be used as a back-up mechanism to the previous two switching processes, guaranteeing that all the nodes will eventually migrate to the new channel. As an alternative approach, the moment a node or OLC is assigned to a network, the SC can start performing synchronized or delegated channel switching using a default channel, assigned to each node or OLC during production.

In order to increase system reliability, multiple delegation nodes (i.e. OLC-Ds) may be used. The SC can assign the delegation nodes one by one or by a multicast message. Furthermore, the delegation nodes can be prioritized based on the previous link quality to the orphan node, geographical closeness to the orphan, or other criteria.

Furthermore, based on the system topology in the previous channel, the SC may also prioritize the orphan nodes. E.g., an orphan node that is on a critical path and close to the SC should be dealt with first. Then, the SC can address other (e.g. further outlying) orphan nodes.

One specific reason that could result in a node or OLC not moving to the new channel may be that the information of the new channel gets corrupted. This could for instance happen in case of a power outage during writing or provision of the new channel information. If the channel information gets corrupted, the node or OLC will go back to its default channel. So, the delegation node can also send the local channel switching command on the default channel. It can thereby bring back or recover the orphan nodes that returned to the default channel to the system in the current channel.

After the above switching control processes, several nodes might still be 'stuck' in the previous channel, for example, due to lost messages or a temporary power outage. For this reason, as already indicated above, an orphan node may proactively scan the entire or its available frequency band when it did not receive messages for a prolonged, predefined period of time. For this purpose, messages (e.g. SCM) are distributed in the system at least every X seconds, where the predefined period of time can be set to at least M*X seconds, where M>>1. The orphan node judges that the system is in the current (or new) channel based on the used network identity (ID, e.g. personal area network ID (PAN-ID)) and/or security key in the channel. It does not need to check messages addressed to itself, but can also use message addressed to other nodes for this purpose. If the system's operating channel is found via SC's or OLC's broadcast messages, the orphan node can switch to the new channel and report to the SC that it has moved to the new channel. Subsequently, the SC can update its orphan list.

In the presence of interference, there can be cases where multiple OLCs 20 are unable to communicate with the SC. To solve such situations, it might be necessary for the system to assign multiple delegate nodes in the delegated switching process.

In the following, a second embodiment is described, where a prioritization approach is used to select delegate nodes as part of the channel switching protocol or process described in the first embodiment. The proposed prioritization can depend on parameters such as geographic distance between working (i.e. responding) OLCs and orphan OLCs, hop count distance between working OLCs and orphan OLCs, RSSI (received signal strength indicator) values between working OLCs and orphan OLCs. The prioritization can be performed based on a centralized approach where the SC makes decisions using location information of the OLCs that were allocated to it during the commissioning phase (i.e. there is no information collected from the OLCs to help the SC in the decision-making process), or on a distributed approach where the SC uses data provided by the OLCs on a periodic basis (such as RSSI or neighborhood information).

Figure 4:
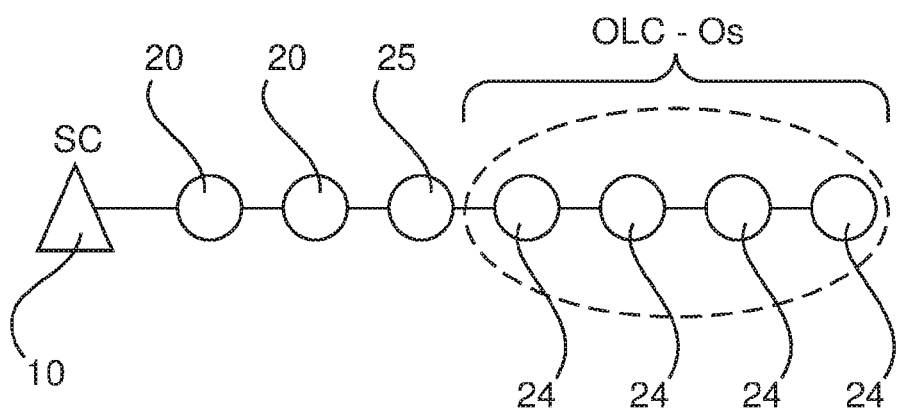
FIG. 4 shows a schematic network structure with a plurality of registered orphan nodes.

FIG. 4 shows a schematic network structure with an SC 10, a plurality of OLCs 20 and a plurality of disconnected nodes 24 which are registered as orphan OLCs (OLC-Os) at the SC 10 due to their disconnection. If interference is faced by a node 25 which is located somewhere in the middle of the network topology, there is a possibility that the network can become disconnected. As illustrated in FIG. 4, this will result in multiple OLCs 24 becoming registered as OLC-Os at the SC 10.

In order to resolve this issue, the SC 10 then may switch the entire network's operating channel to another channel that is free from interference. As the SC 10 is unable to contact any of the OLC-Os 24 due to the disconnection, it then needs to choose an appropriate node that can act as a delegate OLC. The delegate OLC should be chosen such that it is within communication range of one of the OLC-Os 24. It is noted, however, that in the presence of multiple OLC-Os 24, it might be necessary to use multiple delegate OLCs, i.e. all the OLCs may not be within direct communication range of a single delegate OLC. The question is then how should the SC 10 prioritize potential delegate OLCs in order to choose the correct OLC as a delegate node.

The proposed prioritization scheme according to the second embodiment is based on a single or a combination of several parameters such as distance, hop counts or RSSI values. The prioritization scheme helps eventually choose an appropriate delegate OLC. It is however pointed out that the above-mentioned parameters are just several examples. In general, any parameter or combination of parameters that can have a positive impact on packet receive rates can be considered to support choosing a delegate OLC. The chosen parameter can then be used to create a ranking table of potential delegate nodes.

In the second embodiment, distance may be used as an exemplary parameter that can help the system (e.g. the SC) to choose an appropriate delegate OLC. In order to recover a particular orphan OLC, the prioritization process of the protocol initially ranks all non-orphan OLCs in the network based on their distance from the orphan OLC. This ranked list is stored in a distance ranking table which may be maintained at the SC.

When multiple orphan OLCs exist, the orphan OLC that is the closest to a neighboring non-orphan OLC can be identified. This can be carried out by choosing the first (top most entry) orphan/non-orphan OLC pair listed in the distance ranking table, wherein the first entry in the distance ranking table indicates the pair with the smallest distance between orphan OLC and the non-orphan OLC. In the event that this distance-based approach fails and the non-orphan OLC that is closest to the orphan OLC is unable to successfully transmit messages to the orphan OLC, the SC may simply time out. It then repeats the process by choosing the next orphan/non-orphan OLC pair listed in the distance ranking table. The process can be repeated until the SC has attempted to recover all nodes within the network.

The required distance information to be entered in the distance ranking table may be obtained based on Global Positioning System (GPS) coordinates of all OLCs stored by the SC during the commissioning phase, or based on estimations of the OLCs which estimate their distance using a localization algorithm (e.g. based on either RSSI or connectivity information from their neighbors).

Several tables can be used to allow the system to recover all orphan OLCs in the network. All tables may be stored at the SC or at a backend part of the network. An orphan list table may store the IDs of the OLCs that do not respond to messages sent out by the SC. In other words, it indicates nodes that the SC has failed to establish contact with. The content of this table is dynamic and is regularly updated by the SC as and when required.

Additionally, an orphan/working OLC distance matrix (OWDM) may store the distance between every orphan OLC and working OLC. The table may be updated by the SC every time the orphan list table is updated. The distances may for example be computed using the position information of the OLCs that is entered into the system during commissioning or using a location estimation received from the OLCs.

FIG. 5 shows an exemplary distance matrix of orphan (OLC-Os) and working nodes (OLCs), where $d(ID_a, ID_b)$ refers to the distance between an orphan OLC with $ID_a$ and a working OLC with $ID_b$.

Furthermore, a distance ranking table (DRT) may be used, which ranks the OLC-O/OLC pairs of the OWDM according to increasing distance. Thus, the larger the rank, the further the distance between the orphan OLC (OLC-O) and the working OLC (OLC) of the respective pair. The distance information can be obtained from the OWDM.

Several rules can be applied for generating the DRT. As a first rule, only pairs with a distance less than a user-defined maximum transmission range are listed in this table. This ensures that a working OLC which is outside the transmission range of the orphan OLC will not be assigned to be a delegate of the orphan OLC. As a second rule, every orphan OLC can only have a single entry in the DRT. The DRT is updated every time there is a change in the orphan list table.

FIG. 6 shows an exemplary distance ranking table where R designates the rank and each table entry includes the ID of the OLC-O and the ID of the OLC of the respective pair their distance $d(ID_a, ID_b)$.

Moreover, a failed orphan list table may be provided, which lists orphan OLCs that were not recovered at the first attempt, and a permanently failed orphan list table, which lists orphan OLCs that the SC has been unable to recover even after multiple attempts.

As an additional option, a failed orphan/working OLC distance matrix (FOWDM) may be maintained, which is similar to the OWDM but includes failed orphan OLCs.

As soon as the SC has one or more orphan OLCs listed in its orphan list table, the SC needs to decide which orphan OLC to attempt to recover first, and once the orphan OLC has been identified, it needs to choose an appropriate delegate node that can ensure, with a high probability, that the orphan OLC can be recovered successfully.

Figure 7:
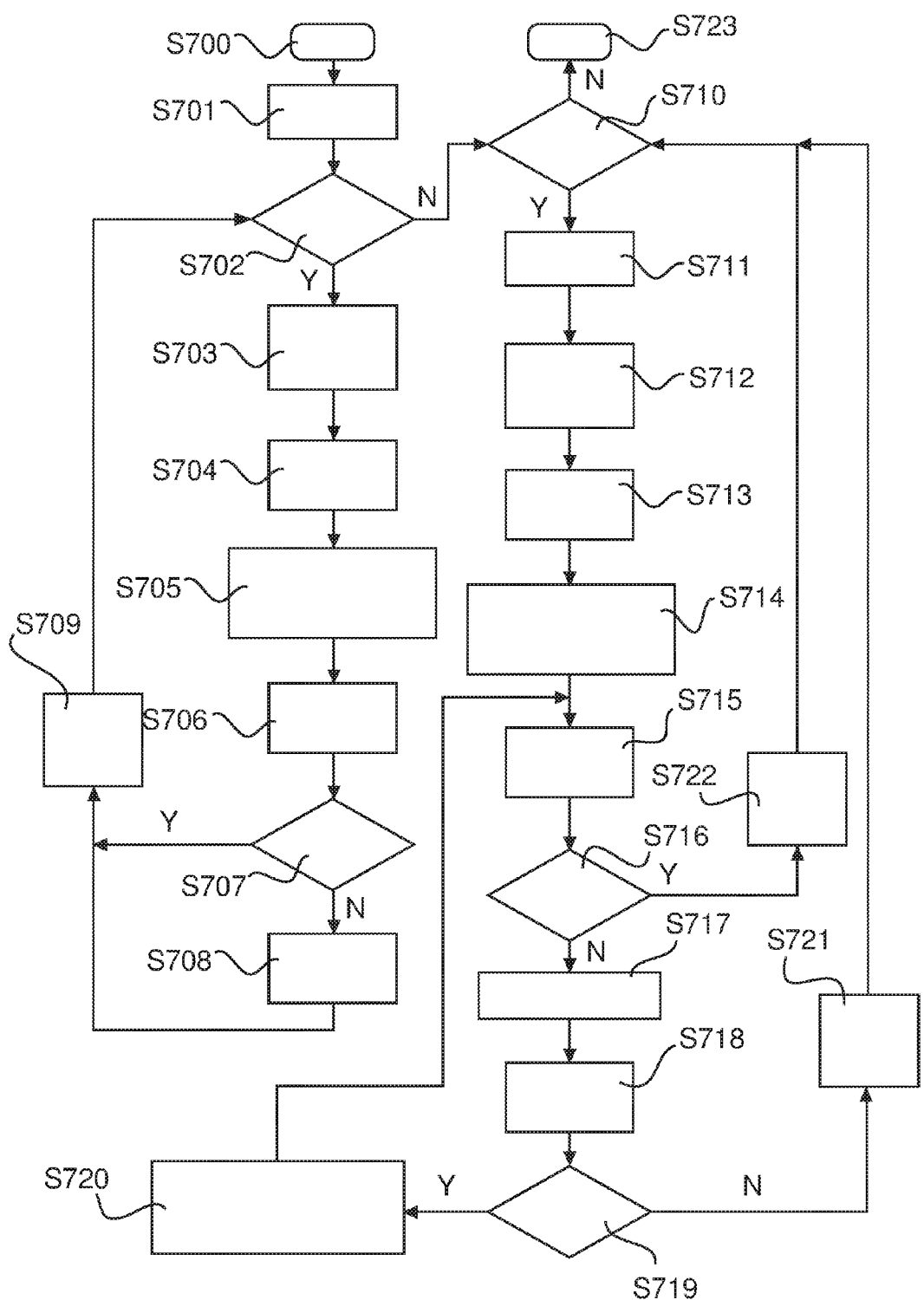
FIG. 7 shows a flow diagram of a protocol for assigning delegate nodes according to a second embodiment.

FIG. 7 shows a flow diagram of a protocol for assigning delegate nodes according to the second embodiment.

As illustrated in FIG. 7, the procedure starts with step S700 and the above tasks of the SC are carried out by choosing the orphan/working OLC pair that is the closest to each other. This is obtained by targeting the orphan/working OLC pair that is at the top of the DRT.

First, the channel switching operation of FIG. 2 is executed in step S701 and it is checked in step S702 whether any orphan OLC exists in the orphan list table. If not, the procedure jumps to step S710 and it is checked whether any orphan OLC exists in the failed orphan list table. If not, the procedure ends in step S723. If an orphan node has been found in the orphan list table in step S702, the OWDM is generated or updated in step S703. Then, in step S704, the DRT is generated or updated based in the OWDM. Then, the topmost orphan ORT and the topmost delegate (i.e. working) ORT of the DRT are selected in step S705. Once the orphan/working OLC pair has been identified, the next step S706 uses the delegated channel switching procedure of FIG. 3 to attempt to recover the identified orphan OLC by using the selected delegate OLC. In step S707 it is checked whether the recovery was successful. If it is determined in step S707 that recovery of the identified orphan OLC has failed, the orphan OLC is moved in step S708 to the failed orphan list table and its entry is removed in step S709 from the orphan list table. If it is determined in step S707 that the recovery operation was a success, the procedure directly branches to step S709 and the orphan OLC is only removed from orphan list table. In both cases, after step S709 the procedure jumps back to step S702 to check if there are any other orphan OLCs listed in the orphan list table. This process of steps S702 to S709 is continued until all the entries in the orphan list table have been addressed. Every time an orphan OLC is successfully recovered the orphan OLC, the OWDM and DRT tables are regenerated before addressing the next orphan/working OLC pair.

Once the Orphan List Table has been fully processed, the next step is to check the failed orphan list table in step S710—if it has any entries. At this stage, every pair of failed orphan OLC and working OLC is addressed one at a time and the system attempts to successfully recover the previously failed orphan OLC using all pairs of failed orphan OLCs and working OLCs that are within communication range. The recovery is attempted in steps S711 to S722 using each pair at a time. If a failed orphan node has been found in the failed orphan list table in step S710, a recovery counter is set to zero. Then, the FOWDM is generated or updated in step S712. Thereafter, in step S713, the DRT is generated or updated based in the FOWDM. Then, the topmost failed orphan ORT and the topmost delegate (i.e. working) ORT of the DRT are selected in step S714. In the next step S715 the delegated channel switching procedure of FIG. 3 is used to attempt to recover the identified failed orphan OLC by using the selected delegate OLC. In step S716 it is checked whether the recovery of the previously failed orphan OLC was successful. If it is determined in step S716 that the recovery operation of the failed orphan node was a success, the procedure branches to step S722 and the failed orphan OLC is removed from the failed orphan list table. Then, the procedure jumps back to step S710 to check if there are any other failed orphan OLCs listed in the failed orphan list table. Otherwise, if it is determined in step S716 that recovery of the identified failed orphan OLC has failed again, the recovery counter is increased by one in step S708 and then the failed orphan node is removed in step S718 from the failed orphan list table. Then, it is checked in step S719 whether the recovery counter has counted to a value less then 3. If the value of the recovery counter is less than 3, the procedure branches to step S720 and the current failed orphan ORT is used again together with a delegate (i.e. working) OLC with next smallest distance from the current failed orphan OLC, as identified in the FOWDM. Then, the procedure jumps back to step S715 to initiate another recovery attempt by the delegated channel switching process. Otherwise, if it is determined in step S719 that the recovery counter has already reached the value 3, the procedure branches to step S721 and the failed orphan node is appended to the permanently failed orphan list table and the procedure jumps back to step S710.

Thus, if the system is still unable to recover a failed orphan OLC after 3 attempts, this failed orphan node is deemed to be unrecoverable by the system. It is however noted that the value "3" is just an example. Any integer value could be used here depending on the individual application and purpose.

Furthermore, the controller functionality of the SC or the SC itself may be provided in a remote computer connected to the Internet. Thus, all functionality that has been described so far for the SC can also be implemented in a remote computer.

To summarize, a channel switching strategy and corresponding protocol for a mesh network which comprises an SC or other remote control controller and a large number of OLCs or other network nodes have been described. A channel switching process is initiated and managed by the SC which transmits a main channel switching command to all nodes in the system. Following the actual channel switch, the SC delegates responsibility to request an orphan node to switch to the new channel to a selected delegate node which may be a neighbor node of the orphan node. The selection of the delegate node may be based on a prioritization. When an OLC does not receive any messages for a specified, prolonged period of time, it may scan available frequency bands to find the (new) channel in which the networked system operates at that time.

While the invention has been illustrated and described in detail in the drawings and foregoing description, such illustration and description are to be considered illustrative or exemplary and not restrictive. The invention is not limited to the disclosed embodiment. Beyond outdoor lighting control, the propose switching control processes and systems can be implemented in various other mesh networking systems as e.g. used for lighting control, home automation, patient monitoring, intelligent building control and other sensor networking applications.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 2, 3 and 7 can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A controller device for controlling channel switching in a multi-channel mesh-type network with a plurality of network nodes, said controller device being adapted to transmit a main channel switching command to said network nodes, maintaining a list of orphan nodes, wherein the orphan nodes are network nodes from which no response to said main channel switching response has been received based on received responses to said main channel switching command and wherein the list includes a number of orphan nodes and orphan node locations, select one or more delegate nodes based on the list, wherein the one or more delegate nodes are in the neighborhood of at least one of the orphan nodes's location, and to control said one or more delegate nodes so as to transmit a local channel switching command from said one or more delegate nodes to the at least one orphan nodes.

2. The device of claim 1, wherein said controller device is adapted to select a neighbor node of said orphan node as said delegate node.

3. The device of claim 1, wherein said controller device is adapted to add to said channel switching command a timing parameter which specifies an amount of time for which said network nodes should still stay in their current channel.

4. The device of claim 3, wherein said controller device is adapted to select said timing parameter based on one or both of an observed size and a link quality of said mesh-type network.

5. The device of claim 1, wherein said controller device is adapted to maintain a list of orphan nodes and to update said list of orphan nodes based on responses to said local channel switching command.

6. The device of claim 1, wherein said controller device is adapted to prioritize said selected delegate nodes based on a previous link quality or a geographical closeness to said orphan nodes.

7. The device of claim 6, wherein said controller device is adapted to prioritize said selected delegate nodes based on location information obtained during a commissioning phase of said delegate nodes and/or orphan nodes or based on data received from said delegate nodes and/or orphan nodes while the network is in operation.

8. The device of claim 1, wherein said controller device is adapted to prioritize said orphan nodes based on a routing path or link quality or a combination of both between said controller device and said orphan nodes.

9. The device of claim 1, wherein said controller device is adapted to create a ranking table of distances or link qualities or a combination of both between network nodes from which a response to said main channel switching command or said local channel switching command has been received and orphan nodes from which no response to said main and local channel switching commands has been received, and to successively select an orphan node and a delegate node based on a ranking in said ranking table until said controller device has attempted to recover all orphan nodes of said mesh-type network.

10. A method of controlling channel switching in a multi-channel mesh-type network with a plurality of network nodes, said method comprising the steps of:
    transmitting a main channel switching command to said network nodes,
    maintaining a list of orphan nodes, wherein the orphan nodes are network nodes from which no response to said main channel switching response has been received based on received responses to said main channel switching command and wherein the list includes a number of orphan nodes and orphan node locations,
    selecting one or more delegate nodes based on the list, wherein the one or more delegate nodes are in the neighborhood of at least one of the orphan nodes's location,
    transmitting one or more local channel switching commands from said one or more delegate nodes to the at least one orphan nodes.

11. A non-transitory computer readable medium having stored thereon instructions for causing a processing unit to execute a method for controlling channel switching in a multi-channel mesh-type network with a plurality of network nodes, the medium comprising code for:
    transmitting a main channel switching command to said network nodes,
    maintaining a list of orphan nodes, wherein the orphan nodes are network nodes from which no response to said main channel switching response has been received based on received responses to said main channel switching command and wherein the list includes a number of orphan nodes and orphan node locations,
    selecting one or more delegate nodes based on the list, wherein the one or more delegate nodes are in the neighborhood of at least one of the orphan nodes's location,
    transmitting one or more local channel switching commands from said one or more delegate nodes to the at least one orphan nodes.

* * * * *